(12) United States Patent
Ghafoor et al.

(10) Patent No.: US 10,013,561 B2
(45) Date of Patent: Jul. 3, 2018

(54) DYNAMIC PRE-BOOT STORAGE ENCRYPTION KEY

(71) Applicant: NCR Corporation, Duluth, GA (US)

(72) Inventors: Gameelah Ghafoor, Scotland (GB); Graham Flett, Scotland (GB)

(73) Assignee: NCR Corporation, Atlanta, GA (US)

( * ) Notice: Subject to any disclaimer, the term of this patent is extended or adjusted under 35 U.S.C. 154(b) by 99 days.

(21) Appl. No.: 14/927,938

(22) Filed: Oct. 30, 2015

(65) Prior Publication Data

US 2017/0124329 A1 May 4, 2017

(51) Int. Cl.
| | | |
|---|---|---|
| *G06F 9/00* | (2006.01) | |
| *G06F 15/177* | (2006.01) | |
| *G06F 21/57* | (2013.01) | |
| *G06F 21/60* | (2013.01) | |
| *G06F 21/80* | (2013.01) | |
| *G06Q 20/10* | (2012.01) | |
| *G06Q 20/18* | (2012.01) | |
| *H04L 9/08* | (2006.01) | |
| *H04L 9/14* | (2006.01) | |

(52) U.S. Cl.
CPC .......... *G06F 21/575* (2013.01); *G06F 21/602* (2013.01); *G06F 21/80* (2013.01); *G06Q 20/1085* (2013.01); *G06Q 20/18* (2013.01); *H04L 9/0861* (2013.01); *H04L 9/14* (2013.01); *G06F 2221/2107* (2013.01)

(58) Field of Classification Search
None
See application file for complete search history.

(56) References Cited

U.S. PATENT DOCUMENTS

| | | | |
|---|---|---|---|
| 2002/0083362 A1* | 6/2002 | Semo | G06F 9/4416 714/4.11 |
| 2006/0026429 A1* | 2/2006 | Kudo | G06F 21/575 713/173 |
| 2009/0013166 A1* | 1/2009 | Crowder, Jr. | G06F 21/31 713/2 |
| 2013/0061298 A1* | 3/2013 | Longobardi | G06F 21/42 726/6 |

(Continued)

FOREIGN PATENT DOCUMENTS

| | | |
|---|---|---|
| EP | 2204754 A1 | 7/2010 |
| EP | 2645288 A2 | 10/2013 |
| WO | 03027816 A1 | 4/2003 |

OTHER PUBLICATIONS

European Search Report dated Feb. 15, 2017 issued in co-pending European Patent Application 16183362.9.

*Primary Examiner* — Fatoumata Traore
(74) *Attorney, Agent, or Firm* — Schwegman, Lundberg & Woessner

(57) ABSTRACT

During a pre-boot cycle of a device an algorithm is obtain from a first portion of the hard drive. The algorithm is executed to obtain a key. The key is used to decrypt a second portion of the hard drive to obtain a second key. The second key is used to dynamically decrypt a third portion of the hard drive. A new randomly generated version of the algorithm is produced. The new version of the algorithm is stored in the first portion of the hard drive. The new version of the algorithm is executed to produce a new randomly generated version of the key. The new version of the key is used to re-encrypt the second portion of the hard drive having the second key.

18 Claims, 4 Drawing Sheets

(56) References Cited

U.S. PATENT DOCUMENTS

2014/0079221 A1\* 3/2014 McCallum ............ H04L 9/0822
    380/277
2014/0164725 A1\* 6/2014 Jang ..................... G06F 21/575
    711/163
2014/0289537 A1   9/2014 Parsons et al.

\* cited by examiner

DYNAMIC PRE-BOOT STORAGE ENCRYPTION KEY

BACKGROUND

Automated Teller Machines (ATM) are in general believed to be relatively secure devices since they handle consumer financial transactions. However, ATMs are susceptible to malware, viruses, and eavesdropping just like any other device having memory and processor capabilities.

Moreover, an ATM is especially lucrative to any eavesdropper capable of compromising the ATM execution environment. An ATM is not only loaded with currency, but also handles financial account information for consumers. Still further, the ATM has access to a secure financial network that can access many different financial institutions and likely has access to a branch server that interfaces over a separate network connection with the ATM's core banking system. ATMs may also be networked to one another within a bank branch. Thus, a compromised ATM could potentially create security issues for many customers and many financial institutions.

One technique for ensuring security is to decrypt an ATM's hard drive and store the decryption key either on a remote server or on the hard drive itself in a designated hidden area of the hard drive that is not encrypted. On ATM boot the decryption key is obtained either from the server or the designated area on the hard drive and used to decrypt the operating system (OS) from the hard drive. Then, when the OS is loaded the decryption key is passed to the OS and the OS decrypts the hard drive as needed during operation of the ATM.

The issue with storing the decryption key on a remote server is that often ATMs can experience network bandwidth or connectivity issues with the network connection between the remote server holding the decryption key and the ATM, which means either obtaining the key is impossible or too time consuming due to bandwidth issues. But, the ATM may still have good connectivity to its financial switch network and/or local bank branch server, which means that but for the inability to obtain the decryption key from the remote server, the ATM could be operational for customer use.

An issue with storing the decryption key on the hard drive in a designated unencrypted area of the hard drive is that should that key be compromised, the entire ATM hard drive may need re-encrypted with a new encryption key. Encrypted the entire hard drive of an ATM is a time consuming process and usually only done once on initial hard drive install on an ATM. Moreover, multiple ATMs typically share the same location on the hard drive where their decryption/encryption keys reside, such that should a location be compromised on a single ATM, all the ATMs become susceptible to compromise and all ATMs will need their hard drives re-encrypted because of the known shared location for the keys.

SUMMARY

In various embodiments, methods and a Self-Service Terminal (SST) for dynamic pre-boot storage encryption key management are presented.

According to an embodiment, a method for dynamic pre-boot storage encryption key management is presented. Specifically, an algorithm is obtained from a first portion of a storage during a pre-boot cycle of a device. The algorithm is executed to obtain a key. A second portion of the storage is decrypted with the key to obtain a second key. The second key is provided to a process executing on the device that uses the second key to decrypt a third portion of the storage. The storage may comprise a hard disk drive or other computer storage device.

DETAILED DESCRIPTION

Figure 1:
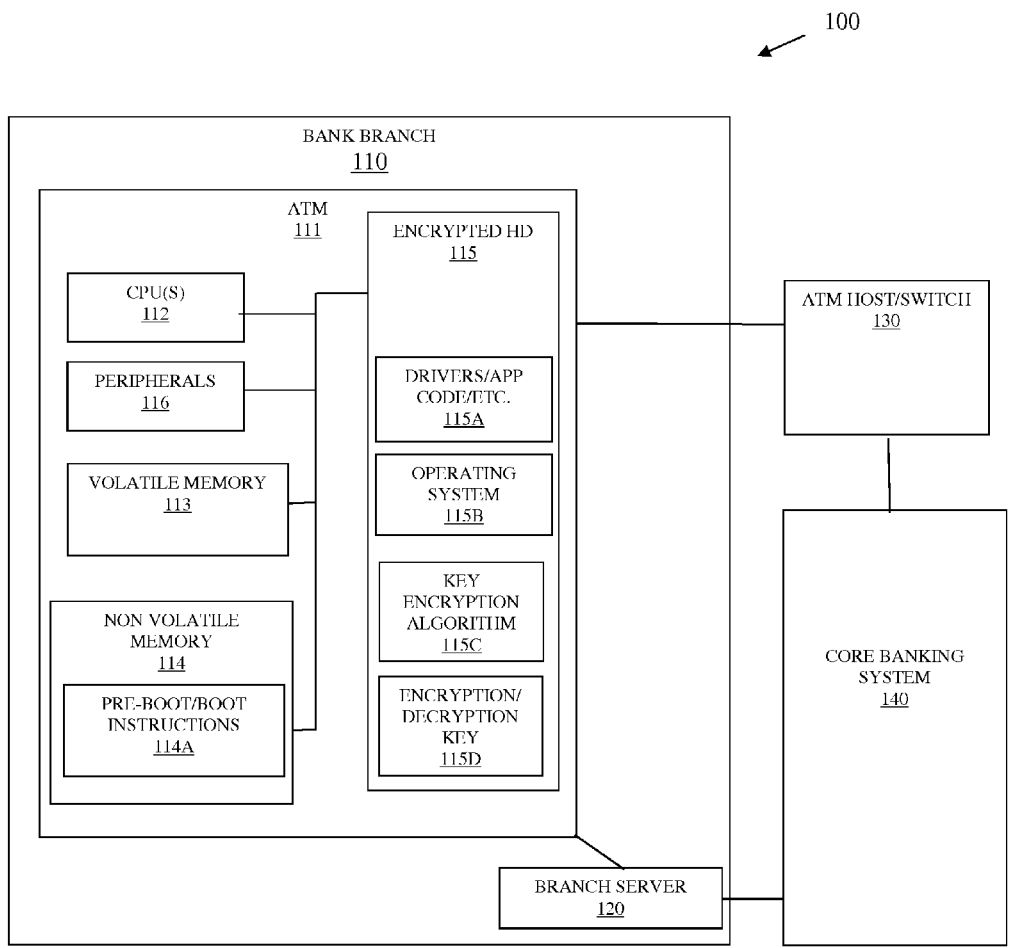
FIG. 1 is a diagram of a banking system for providing dynamic pre-boot hard disk encryption key management on an Automated Teller Machine (ATM), according to an example embodiment.

FIG. 1 is a diagram of a banking system 100 for providing dynamic pre-boot hard disk encryption key management on an Automated Teller Machine (ATM), according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of dynamic pre-boot hard disk (HD) encryption key (EK) management, presented herein and below.

The banking system 100 includes a bank branch 110, an ATM host/switch 130, and a core banking system 140. The bank branch 110 includes: an ATM 111 and a branch server 120.

The ATM 111 includes one or more Central Processing Units (CPU(s) 112, volatile memory 113, non-volatile memory 114, an encrypted HD 115, and multiple peripheral devices 116. The non-volatile memory 114 includes new and novel pre-boot/boot instructions 114A. The encrypted HD 115 includes drivers/application code/etc. 115A, an operating system (OS) 115B, a new and novel key encryption algorithm 115C, and an encryption/decryption (EK) key 115D.

In a conventional scenario, the ATM is installed with non-volatile memory having a Binary Input/Output System (BIOS) that either acquires an EK (the "encryption key (EK)" may also be the decryption key as used herein) from the HD or obtains it from a network connection to a remote server. The BIOS then loads the OS into volatile memory from the HD. Either the BIOS or the OS encrypts the HD a first time with the EK (the BIOS passes the EK to the OS for the OS to dynamically decrypt the HD as needed). It is noted that it may be that the OS on first install at the ATM that acquires the EK from the HD, such that the BIOS is not specialized for doing this in a conventional scenario (this scenario assumes that the OS code is not encrypted with the EK otherwise the OS would never properly load on subsequent boots of the ATM. On subsequent boots or restarts of the ATM, in a conventional scenario, the EK is acquired (through a remote server or a designated non-encrypted area of the HD) by the OS and used to dynamically decrypt the HD as needed.

The manner in which the EK is acquired, managed, and/or processed by the ATM 11 is modified from the conventional approaches as discussed in greater detail herein and below.

On first install of components of the ATM 111, a new and novell BIOS or pre-boot/boot instructions 114A are installed into non-volatile memory 114A (read only memory). The pre-boot/boot instructions 114A queries the peripheral devices 116 interfaced to the ATM 111, such as through Universal Serial Bus (USB) interface queries for the peripheral devices 116 to identify themselves and provide relevant information (Media Access Control Address (MAC) address, protocol version, device serial number, etc.). The peripheral devices 116 can include a variety of devices, such as but not limited to, dispenser, depository, encrypted pin pad (EPP), printer, receipt printer, network interface cards, touch screen, etc.).

Continuing with the first install of the components, after the pre-boot/boot instructions 114A obtains the information (parameter or field values) from the peripheral queries, the pre-boot/boot instructions 114A randomly selects various fields or portions of the fields. In an embodiment, other system attributes available from the CPU 112 may be randomly used as well. System attributes can include a variety of information, such as but not limited to CPU MAC address, device identifier or serial number, size and/or type of processor(s), size and/or type of non-volatile memory 114, size and/or type of volatile memory 113, and the like. Next, the pre-boot/boot instructions 114A randomly defines a key encryption algorithm 115C for generating an Key Encryption Key (KEK) by combining in random order and/or computing in random fashion the randomly selected fields from the queries, the randomly selected system attributes, and/or perhaps date/time/day of week. The KEK is used to encrypt the encryption/decryption key (EK) 115D on the encrypted HD 115 with different encryption from that which the other components of the encrypted HD 115 are encrypted (those other components encrypted with the EK 115D.

The pre-boot/boot instructions 114A then compiles the generated key encryption algorithm 115C and obfuscates that algorithm on the encrypted HD 115 (perhaps storing in a predefined discontinuous order known only to the pre-boot/boot instructions 114A on the encrypted HD 115. Note, the key encryption algorithm 115C is not encrypted on the encrypted HD 115. The compiled version of the key encryption algorithm 115C is available for execution by the CPU 112 from volatile memory 113 after compiling by the pre-boot/boot instructions 114A.

Next, and still on initial first install of the components of the ATM 111, the pre-boot/boot instructions 114A obtains the EK 115D from the encrypted HD 115 (note that up until this point in time the encrypted HD 115 is actually not yet encrypted and the pre-boot/boot instructions 114A is pre-configured to know where to obtain the EK 115D on the HD 115).

The pre-boot/boot instructions 114A causes the CPU 112 to execute the key encryption algorithm 115C from the volatile memory 113, which results in a generation of a KEK. The HD 115 (except for the obfuscated key encryption algorithm code 115C and the EK 115D) is encrypted by the pre-boot/boot instructions 114A using the EK 115D and the EK 115D is encrypted by the pre-boot/boot instructions 114A using the KEK. It is to be noted that the KEK is never stored anywhere on the encrypted HD 115. The OS 115B is then decrypted by the pre-boot/boot instructions 114A using the EK 115D from the now encrypted HD 115 and loaded into volatile memory 113 for execution by the CPU 112. The pre-boot/boot instructions 114A passes the EK 115D to the OS 115B for the OS 115B to use in dynamically decrypting the encrypted HD 115 as needed during operation of the ATM 111.

The above processing reflects the initial encryption of the encrypted HD 115 when that HD 115 is first installed on the ATM 111. The processing that follows reflects processing that occurs on subsequent boots or startups of the ATM 111 after the HD 115 is first installed in the ATM 111 and encrypted with the EK 115D.

On boot or restart of the ATM 111 after initial install of the encrypted HD 115, the pre-boot/boot instructions 114A obtains the key encryption algorithm 115C from pre-defined locations and assembles in a pre-defined order. The pre-boot/boot instructions 114A loads the key encryption algorithm 115C from the HD 115 into volatile memory 113 for execution by the CPU 112. The key encryption algorithm 115 is executed and generates the KEK produced from the previous boot or restart of the ATM 111. The pre-boot/boot instructions 114A then decrypts the EK 115D using the KEK to obtain a decrypted version of the EK 115D. The OS 115B is then decrypted from the HD 115 using the EK 115D. The OS 115B loaded to volatile memory 113 for execution by the CPU 112 and the OS 115B is given the EK 115D to dynamically decrypt the drivers/application code/etc. 115A as needed from the HD 115.

Next, the pre-boot/boot instructions 114A generates a new key encryption algorithm 115C using a random approach as discussed above with reference to the initial install of the HD 115 (and since random a different version each time a new key encryption algorithm 115C is generated). The new encryption algorithm 115C is compiled, loaded to volatile memory 113 for execution by the CPU 112, and obfuscated (in an unencrypted format on the HD 115). The new encryption algorithm 115C is then executed to produce a new KEK. The new KEK is then used to encrypt the EK 115D on the HD 115 and the new KEK is discarded and removed from memory and again never stored on the HD 115.

Each time the ATM 111 is booted or restarted, a previous randomly generated version of the key encryption algorithm 115C is obtained from the HD and executed to produce a previously generated KEK. That KEK permits the EK 115D to be decrypted from the HD and obtained for decrypting the HD 115 as needed by the OS 115B. A new version of the key encryption algorithm 115C is then generated to produce a new KEK. The new KEK used to re-encrypt the EK 115D on the HD 115 and then that KEK is discarded.

It is noted that because the randomly generated key encryption algorithm 115C relies on random information from the peripherals 116, should any of those peripherals not be present on boot or should the CPU 112 be different in some manner (as noticed by the system attributes), the KEK will not properly generate and will not be able to obtain the EK 115D from the HD 115, which means the OS 115B will not load and the HD 115 will be unusable.

Additionally, the novel processing presented herein means that ATM HDs can be securely encrypted with an EK 115D and available even when some or all network connectivity to the ATMs is down or slow. So, ATMs can be booted and ready for use when network connectivity becomes available and do not after to rely on remote EK acquisition from a remote server.

Moreover, because the KEK (used to decrypt and obtain the EK 115D from the HD 115) relies on a randomly generated key encryption algorithm 115C that is dependent on a specific ATM 111 and randomly varies for that specific ATM 111 per boot cycle and because the KEK is never stored on the HD 115, obtaining the KEK is extremely difficult for a hacker. Even in the unlikely event that the key encryption algorithm 115C is cracked, it would only be relevant to the specific ATM 111 to which is applies and not useful for other ATMs and only relevant until that specific ATM 111 is rebooted or restarted.

Some of embodiments of the FIG. 1 and other embodiments are now discussed with reference to the FIGS. 2-4.

Figure 2:
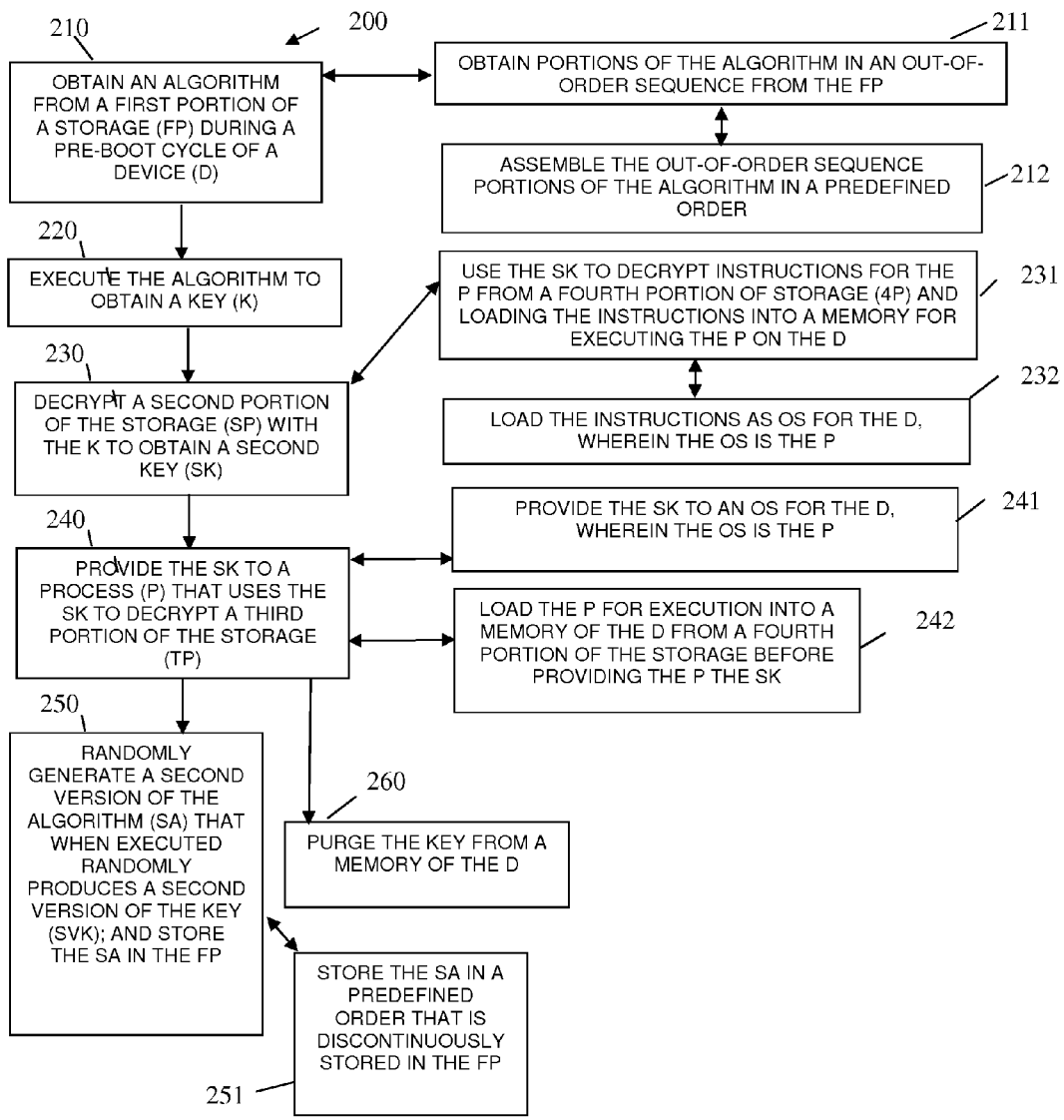
FIG. 2 is a diagram of a method for dynamic pre-boot hard disk encryption key management, according to an example embodiment.

FIG. 2 is a diagram of a method 200 for dynamic pre-boot hard disk encryption key management, according to an example embodiment. The software module(s) that implements the method 200 is referred to as a "pre-boot encryption key manager." The pre-boot encryption key manager is implemented as executable instructions programmed and residing within memory and/or a non-transitory computer-readable (processor-readable) storage medium and executed by one or more processors of a device. The processor(s) of the device that executes the pre-boot encryption key manager are specifically configured and programmed to process the pre-boot encryption key manager. The pre-boot encryption key manager may or may not have access to one or more network connections during its processing. The network connections can be wired, wireless, or a combination of wired and wireless.

In an embodiment, the device that executes the pre-boot encryption key manager lacks network connectivity.

In an embodiment, the device that executes the pre-boot encryption key manager is the ATM 111 of the FIG. 1.

In an embodiment, the device that executes the pre-boot encryption key manager is a Self-Service Terminal (SST). In an embodiment, the SST is a kiosk. In an embodiment, the SST is a self-service checkout station.

In an embodiment, the device that executes the pre-boot encryption key manager is a Point-Of-Sale (POS) terminal. In an embodiment, the POS terminal is operated by a cashier.

In an embodiment, the pre-boot encryption key manager is the pre-boot/boot instructions 114A of the FIG. 1.

In an embodiment, the pre-boot encryption key manager is integrated into a BIOS of the device that executes the pre-boot encryption key manager.

At 210, the pre-boot encryption key manager obtains an algorithm from a first portion of storage during a pre-boot cycle of the device that executes the pre-boot encryption key manager. A pre-boot cycle is processing by the device before the OS of the device is loaded into memory for execution by one or more processors of the device.

According to an embodiment, at 211, the pre-boot encryption key manager obtains portions of the algorithm in an out-of-order sequence from the first portion of the storage. That is, the algorithm is not natively stored in a contiguous or ordered fashion within the first portion of the storage. This is a form of obfuscation of the algorithm and provides an added level of security to the algorithm.

In an embodiment of 211 and at 212, the pre-boot encryption key manager assembles the out-of-order sequence portions of the algorithm in a predefined and proper order know to and configured in the pre-boot encryption key manager.

As an alternative to the processing of 211 and 212, the pre-boot encryption key manager may select the proper sequence for the portions of the algorithm by reading different locations from the first portion of storage in the predefined order necessary for properly assembling the algorithm.

At 220, the pre-boot encryption key manager executes the algorithm to obtain the key. That is, the pre-boot encryption key manager loads the algorithm into memory of the device and issues a call to the processor of the device for the processor of the device to execute the algorithm. The algorithm produces the key (as discussed above with reference to the FIG. 1).

At 230, the pre-boot encryption key manager decrypts a second portion of the storage with the key to obtain a second key. This second key is what was used to encrypt selective portions of the storage on initial install of the storage as discussed above with reference to the FIG. 1 and as discussed below with reference to the FIG. 2.

In an embodiment, at 231, the pre-boot encryption key manager uses the second key to decrypt instructions for the process (discussed at 240 below) from a fourth portion of the storage. The pre-boot encryption key manager then loads the instructions into a memory for the instructions to be executed by the processor of the device as the process (again discussed below at 240).

In an embodiment of 231 and at 232, the pre-boot encryption key manager load the instructions as an OS for the device (the OS is the process discussed below at 240).

At 240, the pre-boot encryption key manager provides the second key to a process (executing on the device).

In an embodiment, at 241, the pre-boot encryption key manager provides the second key to an OS for the device; the OS is the process.

In an embodiment, at 242, the pre-boot encryption key manager loads the process for execution by a processor of the device into a memory of the device from a fourth portion of the storage before the second key is provided to that process.

According to an embodiment, at 250, the pre-boot encryption key manager randomly generates a second version of the algorithm, which when executed randomly produces a second version of the key (as discussed above with reference to the FIG. 1). Next, the pre-boot encryption key manager stores the second version of the algorithm in the first portion of the storage (essentially replacing the original version of the algorithm in the storage). The pre-boot encryption key manager also causes the second version of the algorithm to execute to obtain the second version of the key and then uses that second version of the key to re-encrypt the second portion of the storage having the second key.

In an embodiment of 250 and at 251, the pre-boot encryption key manager stores the second version of the algorithm in a predefined order that is discontinuously stored in the first portion of the storage. Essentially, the second version of the algorithm is obfuscated in storage because it is discontinuously located in storage and only the pre-boot encryption key manager is configured for properly ordering the instructions of the second version of the algorithm.

According to an embodiment, at 260, the pre-boot encryption key manager purges the key from a memory of the device. The key is also not stored anywhere in storage. Moreover, once the second version of the algorithm (processing at 250 and 251) replaces the original algorithm in storage, the key cannot ever be regenerated because the second version of the algorithm (even if successfully compromised) will produce a different version of the original key.

Figure 3:
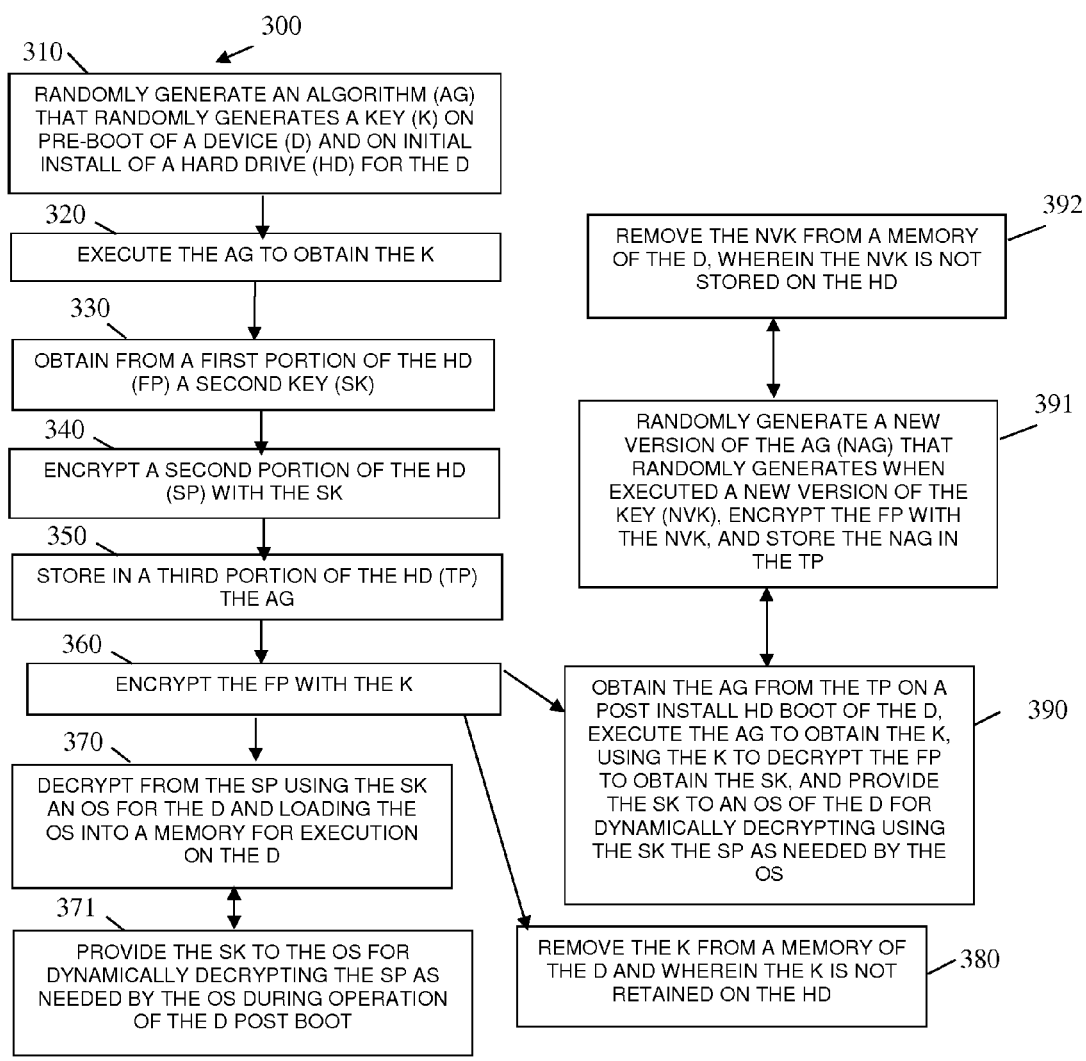
FIG. 3 is a diagram of another method for dynamic pre-boot hard disk encryption key management, according to an example embodiment.

FIG. 3 is a diagram of another method 300 for dynamic pre-boot hard disk encryption key management, according to an example embodiment. The software module(s) that implements the method 300 is referred to as a "hard drive encryption key manager." The hard drive encryption key manager is implemented as executable instructions programmed and residing within memory and/or a non-transitory computer-readable (processor-readable) storage medium and executed by one or more processors of a device. The processors that execute the hard drive encryption key manager are specifically configured and programmed to process the hard drive encryption key manager. The hard drive encryption key manager may or may not have access to one or more network connections during its processing. The network connections can be wired, wireless, or a combination of wired and wireless.

In an embodiment, the device that executes the hard drive encryption key manager lacks network connectivity.

In an embodiment, the device that executes the hard drive encryption key manager is the ATM 111 of the FIG. 1.

In an embodiment, the device that executes the hard drive encryption key manager is a SST. In an embodiment, the SST is a kiosk.

In an embodiment, the device that executes the hard drive encryption key manager is a POS terminal.

In an embodiment, the hard drive encryption key manager is the pre-boot/boot instructions 114A of the FIG. 1.

In an embodiment, the hard drive encryption key manager is integrated into a BIOS of the device that executes the hard drive encryption key manager.

In an embodiment, the hard drive encryption key manager is an enhanced version of the method 200 of the FIG. 2.

The hard drive encryption key manager presents an embodiment of the teachings where a hard drive is initially installed on a device (as discussed above with reference to the FIG. 1). The hard drive encryption key manager also presents embodiments for subsequent boots of the device (as FIG. 1 and the method 200 of the FIG. 2 discussed).

At 310, the hard drive encryption key manager randomly generates an algorithm that when executed randomly generates a key on a pre-boot of the device and on initial install of a hard drive for the device.

At 320, the hard drive encryption key manager executes the algorithm to obtain the key (again, the hard drive encryption key manager loads instructions for the algorithm to memory of the device and the processor(s) of the device execution those instructions from the memory of the device).

At 330, the hard drive encryption key manager obtains from a first portion of the hard drive a second key.

At 340, the hard drive encryption key manager encrypts a second portion of the hard drive with the second key.

At 350, the hard drive encryption key manager stores in a third portion of the hard drive the algorithm.

At 360, the hard drive encryption key manager encrypts the first portion of the storage with the key. Originally, the first portion had the second key in an unencrypted format, the hard drive encryption key manager encrypts that second key using the key obtained from executing the randomly generated algorithm.

According to an embodiment, at 370, the hard drive encryption key manager decrypts the second portion of the hard drive (decrypted at 340) using the second key to obtain an OS for the device. Next, the hard drive encryption key manager loads the OS into memory for execution on the device.

In an embodiment of 370 and at 371, the hard drive encryption key manager provides the second key to the OS for the OS to dynamically decrypt the selective portions of the second portion of the hard drive as needed by the OS during operation of the OS post boot of the device.

In an embodiment, at 380, the hard drive encryption key manager removes the key (generated at 320) from a memory of the device and the key is not retained on the hard drive.

In an embodiment, at 390, the hard drive encryption key manager obtains the algorithm from the third portion of storage (stored at 350) on a post install hard drive boot of the device. Next, the algorithm is executed to obtain the key (same key produced at 320). The key is then used to decrypt the first portion of the hard drive to obtain the second key. The second key is then provided to an OS of the device for the OS to dynamically decrypt (using the second key) the second portion of the hard drive as needed by the OS.

In an embodiment of 390 and at 391, the hard drive encryption key manager randomly generates a new version of the algorithm that randomly generates a new version of the key when executed. The hard drive encryption key manager causes the new version of the algorithm to execute and obtains the new version of the key. The hard drive encryption key manager then uses the new version of the key to re-encrypt the first portion of the hard drive having the second key. The hard drive encryption key manager then stores the new version of the algorithm in the third portion of the hard drive (essentially overwriting the original version of the algorithm on the hard drive with the new version of the algorithm).

In an embodiment of 391 and at 392, the hard drive encryption key manager removes the new version of the key from a memory of the device and the new version of the key is not stored anywhere on the hard drive.

Figure 4:
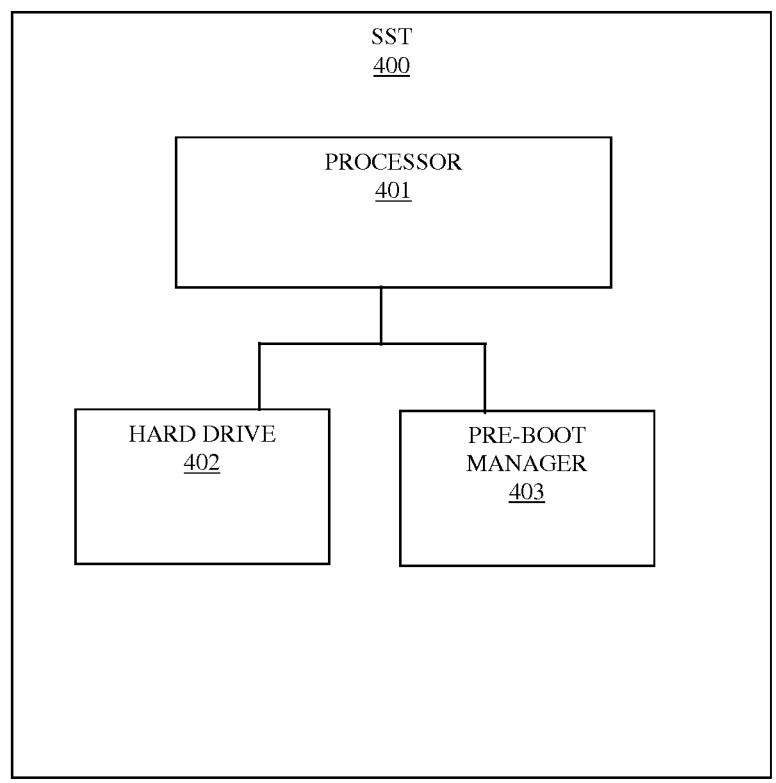
FIG. 4 is a diagram of a Self-Service Terminal (SST), according to an example embodiment.

FIG. 4 is a diagram of a SST 400, according to an example embodiment. The SST 400 includes a variety of hard ware components and software components. The software components of the SST 400 are programmed and reside within memory and/or a non-transitory computer-readable medium and execute on one or more processors of the SST 400. The SST 400 may or may not communicate over one or more networks, which can be wired, wireless, or a combination of wired and wireless.

In an embodiment, the SST 400 lacks any network connectivity.

In an embodiment, the SST 400 is the ATM 111 of the FIG. 1.

In an embodiment, the SST 400 is a kiosk.

In an embodiment, the SST 400 is a POS terminal.

The SST 400 includes a processor 401, a HD 402 and a pre-boot manager 403.

The pre-boot manager 403 is adapted and configured to: execute on the processor 401 during a boot cycle of the SST 400, obtain an algorithm from a first portion of the hard drive 402, execute on the processor 401 the algorithm to obtain a key, decrypt a second portion of the hard drive 402 to obtain a second key, and provide the second key to an OS) of the SST 400 for dynamically decrypting a third portion of the hard drive 402 as needed by the OS.

In an embodiment, The SST of claim 18, wherein the pre-boot manager 403 is further configured to: randomly generating a new version of the algorithm that randomly produces a new version of the key, and store the new version of the algorithm in the first portion of the hard drive 402.

In an embodiment, the pre-boot manager 403 is the pre-boot/boot instructions 114A of the FIG. 1.

In an embodiment, the pre-boot manager 403 is the method 200.

In an embodiment, the pre-boot manager 403 is the method 300.

In an embodiment, the pre-boot manager 403 is integrated into a BIOS of the SST 400.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    obtaining, on a device, an algorithm from a first portion of a storage during a pre-boot cycle of the device;
    executing, by the device, the algorithm to obtain a key;
    decrypting a second portion of the storage with the key to obtain a second key;
    providing the second key to a process executing on the device that uses the second key to decrypt a third portion of the storage and allowing the device to boot with the second key for decrypting an encrypted operating system (OS) from storage and loading the decrypted OS into a memory of the device for execution;
    changing the algorithm to a second version of the algorithm;
    processing the second version of the algorithm to produce a new key;
    encrypting the second key with the new key producing an encrypted new key; and
    storing the encrypted new key in the second portion of the storage and storing the new version of the algorithm in the first portion of storage.

2. The method of claim 1, wherein chancing further includes:
    randomly generating the second version of the algorithm that when executed produces the new key.

3. The method of claim 2, wherein storing further includes storing the second version of the algorithm in a predefined order that is discontinuously stored in the first portion of the storage.

4. The method of claim 1 further comprising, purging the key from the memory of the device.

5. The method of claim 1, wherein obtaining further includes obtaining portions of the algorithm in an out-of-order sequence from the first portion of storage.

6. The method of claim 5, wherein obtaining further includes assembling the out-of-order sequence portions of the algorithm in a predefined order.

7. The method of claim 1, wherein decrypting further includes using the second key to decrypt instructions for the process from a fourth portion of storage and loading the instructions into a memory for executing the process on the device.

8. The method of claim 7, wherein using further includes loading the instructions as the decrypted operating system (OS) for the device, wherein the OS is the process.

9. The method of claim 1, wherein providing further includes providing the second key to the decrypted operating system (OS) for the device, wherein the OS is the process.

10. The method of claim 1, wherein providing further includes loading the process for execution into a memory of the device from a fourth portion of the storage before providing the process the second key.

11. A method, comprising:
    randomly generating an algorithm that randomly generates a key during a pre-boot process on a device and on an initial install of a hard drive for the device;
    executing, on the device, the algorithm and obtaining the key as output from the algorithm;
    obtaining from a first portion of the hard drive a second key;
    encrypting a second portion of the hard drive with the second key;
    storing in a third portion of the hard drive the algorithm;
    encrypting the second key with the key and storing the second key in the first portion of the hard drive and on a subsequent boot of the device: obtaining the algorithm from the third portion of the hard drive, processing the algorithm to obtain the key, processing the key against the first portion of the hard drive to obtain a decrypted version of the second key, and processing the second portion of the hard drive with decrypted version of the second key to complete the subsequent boot of the device; and
    decrypting from the second portion of the hard drive, using the second key, an operating system (OS) for the device and allowing the device to boot by loading the OS into a memory of the device for execution.

12. The method of claim 11, wherein decrypting further includes providing the second key to the OS for dynamically decrypting some other portions of the second portion of the hard drive as needed by the OS during operation of the device post boot.

13. The method of claim 11 further comprising, removing the key from a memory of the device and wherein the key is not retained on the hard drive.

14. The method of claim 11 further comprising, obtaining the algorithm from the third portion of the hard drive on a post install hard drive boot of the device, executing the algorithm to obtain the key, using the key to decrypt the first portion of the hard drive to obtain the second key, and providing the second key to the OS of the device for dynamically decrypting using the second key the second portion of the hard drive as needed by the OS.

15. The method of claim 14 further comprising, randomly generating a new version of the algorithm that randomly generates when executed a new version of the key, encrypting the first portion of the hard drive with the new version of the key, and storing the new version of the algorithm in the third portion of the hard drive.

16. The method of claim 15 further comprising, removing the new version of the key from a memory of the device, wherein the new version of the key is not stored on the hard drive.

17. A Self-Service Terminal (SST), comprising:
- a processor;
- a hard drive; and
- a pre-boot manager configured to: i) execute on the processor during a boot cycle of the SST, ii) obtain an algorithm from a first portion of the hard drive, iii) execute on the processor the algorithm to obtain a key, iv) decrypt a second portion of the hard drive to obtain a second key, v) decrypt a third portion of the hard drive to obtain an operating system (OS), vi) allow the SST to boot by loading the OS into a memory of the SST, vii) provide the second key to the OS for the OS to dynamically decrypt a fourth portion of the hard drive as needed by the OS, viii) randomly generate a new version of the algorithm that randomly produces a new version of the key, ix) store the new version of the algorithm in the first portion of the hard drive, x) encrypt the second key with the new version of the key, xi) store the encrypted second key in the second portion of the hard drive, and xii) iterate ii)-xi) on each subsequent boot cycle of the SST.

18. The SST of claim 17, wherein the SST is an ATM.

* * * * *